Patented Feb. 22, 1927.

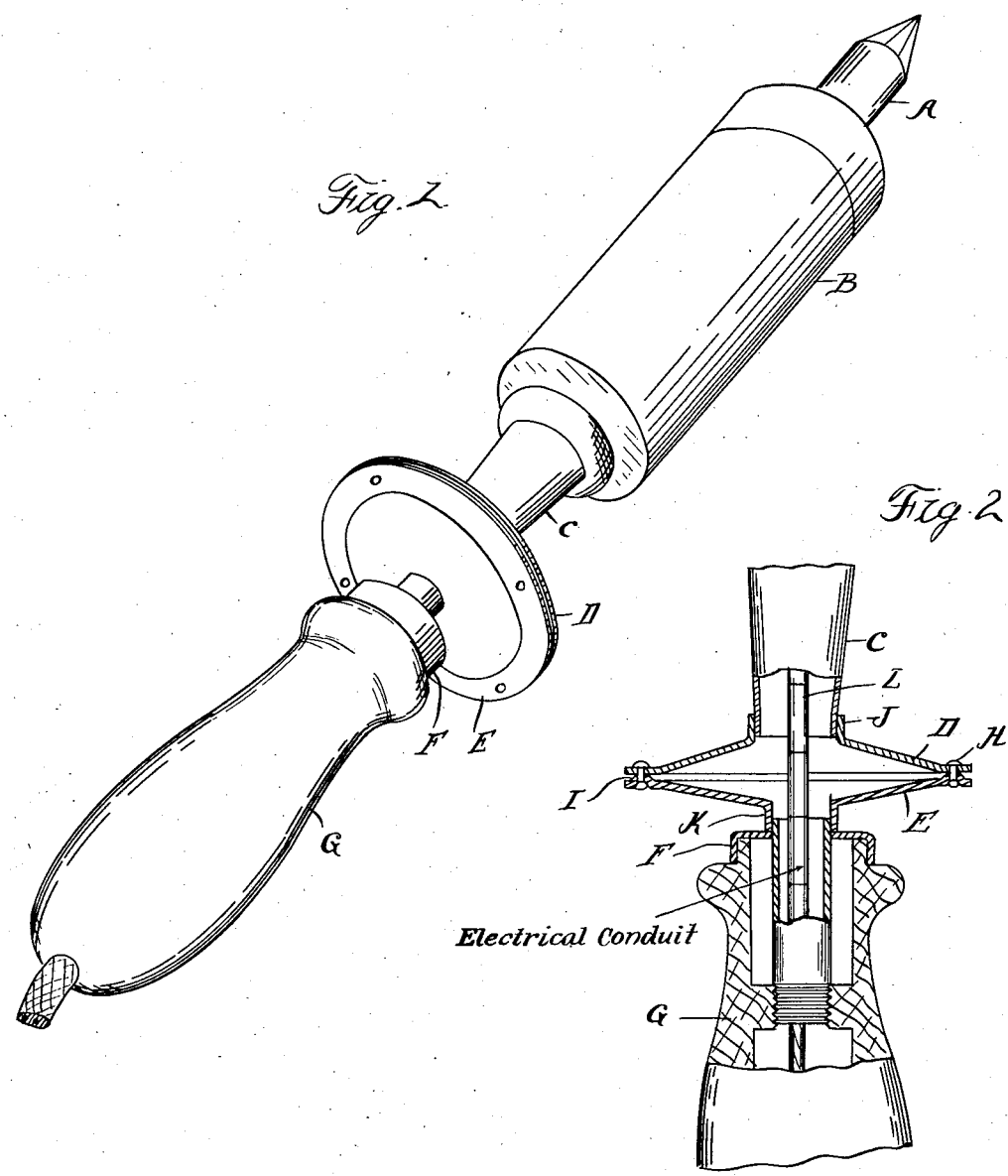

1,618,444

UNITED STATES PATENT OFFICE.

FRANK KUHN AND LAURENCE H. THOMAS, OF DETROIT, MICHIGAN, ASSIGNORS TO AMERICAN ELECTRICAL HEATER COMPANY, OF DETROIT, MICHIGAN, A CORPORATION OF MICHIGAN.

HANDLE FOR HEATED TOOLS.

Application filed April 23, 1923. Serial No. 633,936.

The invention consists in a novel arrangement for securing a handle to a heated tool, the object being to prevent heat conduction and radiation to the handle and at the same time to provide a simple and durable construction.

While, the invention may be applied to a large variety of heated tools, we have specifically shown it in connection with an electric soldering iron, as illustrated in the accompanying drawings, wherein:—

Figure 1 is a perspective view of the tool; and

Figure 2 is a detail sectional view of the coupling for the handle and tool.

A represents a soldering iron provided with a suitable electrical heating device (not shown) enclosed within the casing B. The casing is provided with a reduced shank portion C of tubular construction to which is secured a dished disk D and a similar disk E is mounted upon a tube F supporting the handle G. The disks D and E are spaced from each other and secured together at their peripheries by screws or rivets H to prevent the heat from being conducted from the casing C to the handle G. In order to limit the area of contact between the two disks, one of them is preferably provided with rounding lugs I through which the rivets are inserted and by this means the disks are securely held in spaced relation to each other. The disks are also oppositely dished to provide a greater clearance between the center portions than at the peripheries. Preferably the disks are flared inwardly to form sockets J and K respectively for receiving corresponding tubes C and F which are secured thereto by brazing or other suitable means. L is a tubular insulator which extends from the casing B to the handle G through which the terminals for the heating unit are passed.

With the construction as described, the heat from the tool can be conducted to the handle only through the plates D and E which have a limited area of contact, which prevents any great amount of heat from passing. The disks also form a shield for the handle preventing radiation from the tool from being projected to the handle.

What we claim as our invention is:—

1. The combination with a tool adapted to be heated, of a handle therefor, and means for insulating the handle from the tool, said means including a pair of spaced plates, respectively secured to said handle and said tool and connected together at spaced points along their peripheral portions.

2. The combination with a tool adapted to be heated, of a handle therefor, a pair of spaced plates respectively secured to said handle and said tool for insulating the handle from the tool, and means for securing said plates together at their peripheries through a plurality of relatively small contacting areas, the said contacting areas being so arranged that the major portion of the peripheries of the said disks are also spaced from each other.

3. The combination with a tool adapted to be heated, of a handle therefor, and means for insulating the handle from the tool, said means including a pair of dished disks having their central portions respectively secured to said handle and said tool, and their peripheral portions connected together by rivets or the like having relatively small cross sectional area, the portions of the disks immediately adjacent the said rivets constituting the only points of contact between the said disks.

4. The combination with a tool adapted to be heated, of a tubular casing for said tool, a heat insulating disk secured to said tubular casing and extending radially therefrom, a handle for said tool, a tube secured to said handle, a heat insulating disk mounted upon said tube, and means for securing said disks together to align said tubular casing with the tube for said handle.

5. A heat insulating coupling comprising a pair of disks respectively connected to the members to be insulated, and means for securing said disks together at spaced points along their peripheral portions with a limited area of contact.

6. The combination with a tool adapted to be heated, of a handle therefor, and means for insulating the handle from the tool, said means including a pair of spaced plates respectively secured to said handle and said tool and connected together through a plurality of spaced points, the said points constituting the only points of contact between the said plates.

7. The combination with a tool to be heated and a handle therefor of means for insulating the handle from the tool, said means including a dished disk secured at its center to the tool, a second dished disk secured at its center to the handle, lugs formed around the periphery of one of the said disks, and means for securing the said disks together at their peripheries, the said lugs constituting the only points of contact between the said disks.

8. The combination with a tool adapted to be heated, and a handle for the said tool, of a heat insulating coupling for securing the handle to the tool, the said coupling comprising a pair of dished disks secured respectively to the tool and to the handle and to each other, the said disks having relatively large diameters for shielding the handle from the heat radiated by the tool, and contacting with each other at only a limited number of points for decreasing the heat transferred by conduction from the one disk to the other.

In testimony whereof we affix our signatures.

FRANK KUHN.
LAURENCE H. THOMAS.